United States Patent
Heflinger

[11] 3,715,164
[45] Feb. 6, 1973

[54] FOUR BEAM HOLOGRAPHIC INTERFEROMETRY

[75] Inventor: Lee O. Heflinger, Torrance, Calif.
[73] Assignee: TRW Inc., Redondo Beach, Calif.
[22] Filed: Nov. 1, 1971
[21] Appl. No.: 194,425

[52] U.S. Cl. .................................. 356/109, 350/3.5
[51] Int. Cl. .................................. G01b 9/02, G02b
[58] Field of Search ................ 356/106, 109; 350/3.5

[56] References Cited

UNITED STATES PATENTS 3,619,064  11/1971  Brooks et al. .................... 356/109

Primary Examiner—Ronald L. Wilbert
Assistant Examiner—Conrad Clark
Attorney—Daniel T. Anderson et al.

[57] ABSTRACT

A double-exposure holographic interferometric system for visualizing small disturbances of a subject. The system utilizes two reference beams and two subject beams cast simultaneously on a recording medium in such a way that the two subject beams and the two reference beams each form a small angle with each other. For the second exposure one of the subject beams and one of the reference beams is shifted in phase by 180° with respect to its associated beam. This will create a regular holographic grating which is phase modulated by the disturbances or perturbations of the subject. Upon proper reconstruction of the hologram the phase modulations will cause brightenings of the normally dark background of the reconstructed hologram. The system has the advantage that it is relatively insensitive to errors of phase shift or to variations of the light intensity between the two exposures.

5 Claims, 2 Drawing Figures

INVENTOR.
Lee O. Heflinger
BY Edi A. Osu.
ATTORNEY

FOUR BEAM HOLOGRAPHIC INTERFEROMETRY

CROSS REFERENCE TO RELATED APPLICATION

The present application is related to a copending application to Heflinger, Brooks and Wuerker entitled "- Holographic Subfringe Interferometry" filed on Oct. 20, 1971, Ser. No. 190,916 and assigned to the assignee of the present application. The copending Heflinger et al. application does permit subfringe interferometry as does the present application, but employs different apparatus and method for accomplishing the same purpose.

BACKGROUND OF THE INVENTION

This invention relates generally to holography and particularly relates to double exposure holography to make visible fractional wavelength perturbations of a subject.

In the past the techniques of interferometry have been applied to holography. For example, it is now well known that fringes may be obtained holographically to measure or indicate perturbations of a subject. In this case the path change between adjacent fringes amounts to a wave length. Thus as the subject to be holographed suffers perturbations due to distortions of the subject or small changes of the position of the subject, interference fringes may be obtained by the double exposure holographic technique. As a result dark and bright areas appear wherever the phases of the two holograms cancel or reinforce each other. This makes it possible to show holographically changes indicative of the contour changes or perturbations of the subject.

However, where the perturbations of a subject are less than a whole wavelength this technique becomes insensitive and is of little use.

For example, it may be desired to study aerodynamic flow at reduced pressure. Such aerodynamic shock waves may cause a difference in the light path of much less than a wavelength. Accordingly, such aerodynamic flow cannot be measured by conventional interferometric methods nor by conventional holographic techniques. It may also be desired to measure the thermal distribution about an object to be holographed. An example of this may be the heating of the air around a circuit element such as a resistor due, for example, to an applied electric current or the like. For those and similar problems a technique is required which will make visible in some fashion the difference in the path length of two waves which may be less than a wavelength such as a fractional wavelength.

It is accordingly an object of the present invention to provide a holographic technique for converting perturbations of the subject to be holographed which are less than one wavelength into phase modulations of a regular holographic grating which appears on the exposed hologram.

A further object of the present invention is to provide a holographic technique of the type referred to which is substantially insensitive to errors caused by inaccuracies of the 180° phase shifter for one of the beams with respect to the other or by exposing the hologram with slightly different light intensities on the two exposures.

Another object of the present invention is to provide a double-exposure holographic system which permits to view as brightenings of a normally dark background perturbations of a subject which may amount to considerably less than 1/10 of a wavelength.

SUMMARY OF THE INVENTION

The present invention makes use of a double-exposed hologram for visualizing small perturbations of a subject to be analyzed. This is effected easily by first recording a diffraction grating of the type obtained by Young's fringes.

Accordingly there is provided, as is conventional, a source of coherent, monochromatic light and a recording medium therefore. Further means are provided for splitting the light from the light source into a first subject beam and a first reference beam and into a second subject beam and a second reference beam and casting all of the beams onto the recording medium. The first and the second reference beams form a small angle with each other at the recording medium. Similarly, the first and second subject beams may form the same small angle with each other at the recording medium. This is equivalent to providing two adjacent light sources which generate coherent light and thereby cause fringes at the recording medium which are recorded in the form of a relatively coarse grating.

Further in accordance with the present invention phase shifting means are disposed into the path of at least one of the reference beams and one of the subject beams for shifting the phase of one reference beam with respect to the other by substantially 180° and similarly for shifting the phase of one subject beam with respect to the other substantially by 180°. This is done for the second exposure of the hologram.

When a subject is interposed into the path of the subject beams, perturbations of the subject will cause phase modulations of the relatively fine grating recorded on the recording material.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

DESCRIPTION OF THE PREFERRED EMBODIMENT

Figure 1:
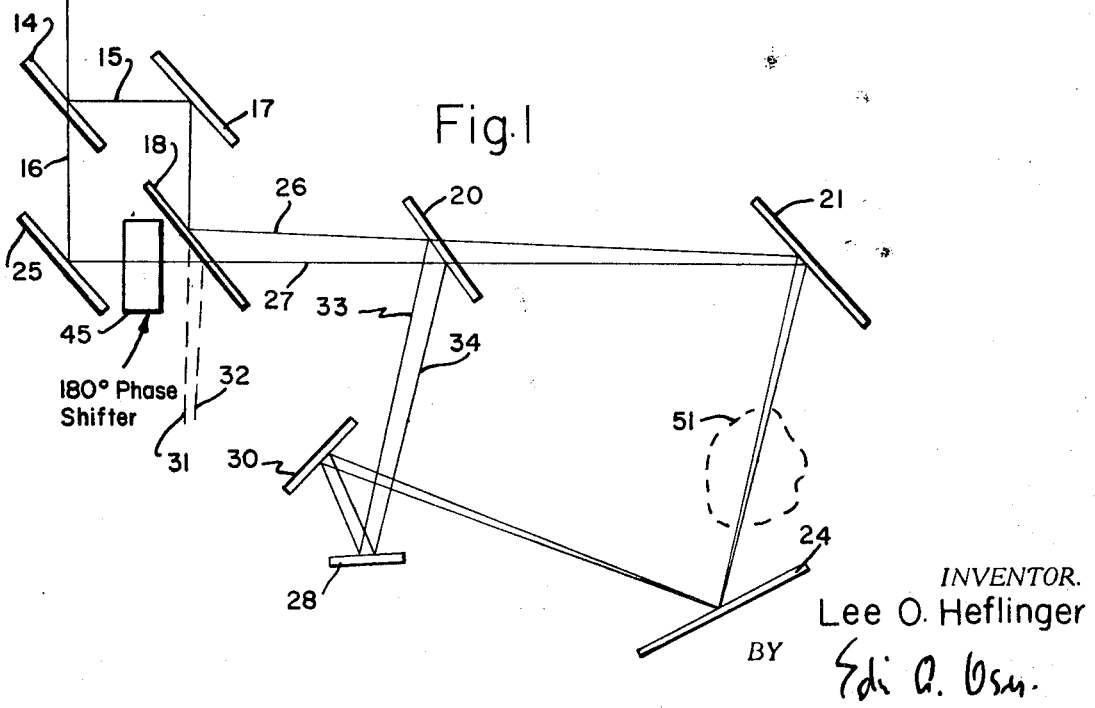
FIG. 1 is a schematic representation of a double-exposure holographic system in accordance with the present invention where a transparent subject is to be holographed.

Referring now to the drawing and particularly to FIG. 1 there is illustrated a source of coherent, monochromatic light such, for example, as a laser 10. The light beam issuing from the laser 10 may be enlarged and collimated by a lens system which may include a negative lens 11 and a positive lens 12. The lens 11 and 12 jointly form a Gallilean telescope and cause a collimated and enlarged light beam to issue.

This light beam is now split by a first beam splitter 14 into a first beam 15 and a second beam 16. Each of the two beams 15 and 16 will subsequently provide a reference and subject or scene beam. The beam splitter 14 preferably provides two light beams 15 and 16 of substantially equal light intensities. This may, for example, be accomplished by a glass wedge coated with a dielectric coating suitable for the particular wavelength of the laser 10. Such a beam splitter 14 provides a very low loss and substantially equal intensity of the two light beams.

The first light beam 15 may be reflected by a reflector 17 such, for example, as a front surface mirror. The light beam reflected by the mirror 17 then is reflected again by a second beam splitter 18. This light beam subsequently passes through a third beam splitter 20, is reflected again by a reflector 21 and is finally cast on a recording medium 24 which may provide the hologram.

The second light beam 16 is reflected by a reflector 25 and subsequently also passes through the beam splitter 18.

One of the four elements 14, 17, 18 and 25 of which elements 14 and 18 are beam splitters and elements 17 and 25 are mirrors, is tilted with respect to the others. Accordingly, the two beams 26 and 27, one of which is reflected by the beam splitter 18 and one of which is passed through the beam splitter 18, form a small angle with each other.

Two reference beams are now provided by the third beam splitter 20. Thus the light ray 26 is reflected by the beam splitter 20 onto a pair of mirrors 28 and 30. A second reference beam is provided by reflection of the beam 27 by the beam splitter 20 and the second reference beam is also reflected by the reflectors 28 and 30, both reference beams being cast on the recording medium 24.

Similarly two subject beams are also obtained from the beams 26 and 27. Thus the beam 26 passes through the beam splitter 20 and is reflected by reflector 21 onto the recording medium 24. Similarly, the beam 27 passes through the beam splitter 20 and is reflected by the reflector 21 onto the recording medium 24.

It will be understood that all mirrors 17, 25, 21, 28 and 30 may be of the same construction. Similarly, the three beam splitters 14, 18 and 20 may be made in the same manner. It will also be understood that the two beam splitters 18 and 20 may be combined. Thus, as shown in FIG. 1, the beam 15 may be transmitted through the beam splitter 18 as a beam 31 while the beam 16 is reflected by the beam splitter 18 as a beam 32. These two beams are parallel to the beams 33 and 34 which are both reflected by the beam splitter 20. Thus, if the mirrors 28 and 30 are moved toward the left of FIG. 1 to intercept the beams 31 and 32, the beam splitter 20 may be omitted.

It will be understood that tilting of one of the four elements 14, 17, 18 and 25 with respect to the others is equivalent to providing two coherent light sources which are separated in space. Such light sources will create Young's fringes, as explained for example, in the book "Physical Optics" by Robert W. Wood, Third Revised Edition, reprinted by Dover Publications Inc., New York (see, for example, pages 162-163 and page 218).

Figure 2:
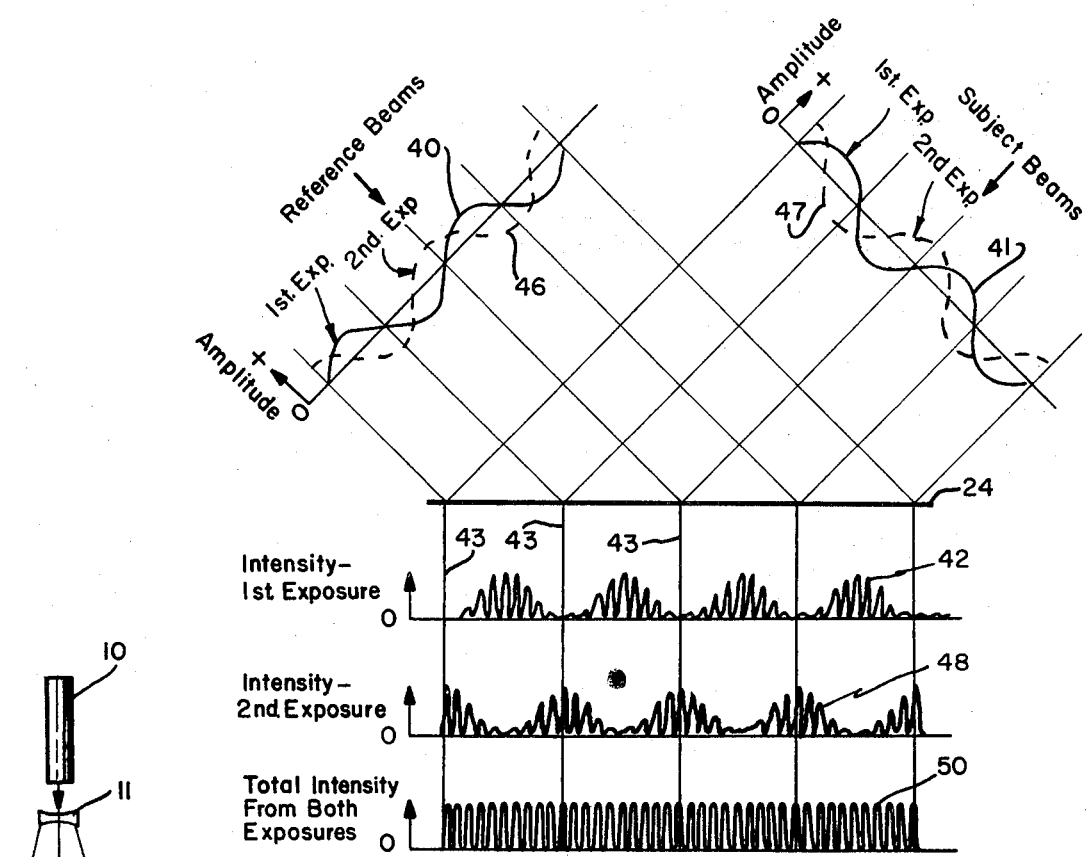
FIG. 2 is a graph and depicts a reference and subject beam both for the first and second exposure falling on a recording medium to aid in an understanding of the operation of the present invention.

The result of casting in this manner two pairs of beams on the recording medium 24 is illustrated in connection with FIG. 2 to which reference is now made. Thus, to repeat, there are two reference beams forming a small angle with each other at the plane of the recording medium 24. Similarly, there are two subject beams which may make the same angle with respect to each other at the plane of the recording medium. However, it should be emphasized that the small angle between the two reference beams and the small angle between the two subject beams need not necessarily be equal. Thus, the difference between these two small angles may be compensated by changing appropriately the angle of the recording medium 24 with the pair of reference beams and with the pair of subject beams. On the other hand the angle between the pair of reference beams and the pair of subject beams may be fairly large, say on the order of 30° to 90°. This situation has been depicted in FIG. 2. Thus, the sine wave 40 in FIG. 2 depicts the composite amplitude of the two reference beams while the composite amplitude of the two subject beams is shown at 41. The two waves 40 and 41 are shown to intersect each other for illustrative purposes at an angle of 90° at the plane of the recording medium. Each of the beams or waves is of a sinusoidal shape and its amplitude is shown by the coordinate system. This sinusoidal amplitude variation is a representation of Young's fringes referred to earlier. The two beams are now cast on the recording material 24 which after exposure forms a hologram. The resulting intensity at the hologram plane is shown at 42 in FIG. 2.

The large angle between the subject and reference beams creates an interference pattern with fine structure as shown by the rapid fluctuations of the intensity pattern 42. The envelope of these fine fringes is a relatively slow variation in intensity which corresponds to the intensity pattern of Young's fringes caused by the small angle between the components of the subject and reference.

The two components of the reference beam, that is the two separate reference beams travelling at a small angle with each other are equivalent to a single wave with an amplitude which varies sinusoidally across the beam. The same, of course, is true for the two subject beams. The interference between the pair of subject beams and the pair of reference beams has an intensity which varies like a $\sin^2$ function. As clearly shown by the wave 42, this has relatively slow intensity variations which repeat periodically between each pair of vertical lines 43. Accordingly, the space between the two adjacent vertical lines 43 is like a strip on the hologram, the importance of which will be explained subsequently.

Thus, the slow amplitude variation between two adjacent vertical lines 43 is the envelope for the fine fringes, that is the slow $\sin^2$ function.

For the second exposure of the double-exposed hologram a phase shift is now introduced. This is a 180° phase shift which may be produced by a phase shifter 45 which in FIG. 1 is shown in the path of the beam 27 ahead of the beam splitter 18. This will introduce a phase shift of 180° between one of the reference beams, that is 34 and its associated reference beam 33 and a corresponding phase shift of 180° between the two subject beams. The phase shift may be accomplished, for example, by physically moving say the reflector 25 so as to introduce a desired 180° phase shift.

As suggested in the copending Heflinger et al. application previously referred to, this may be effected by means of a lead zirconate piezoelectric crystal or other piezoelectric crystals referred to in the copending application. The 180° phase shift corresponds to a displacement of the mirror by $(1/\sqrt{2})(\lambda/2)$.

It will be understood that instead of introducing a 180° phase shift by means of phase shifter 45 into one reference beam and one subject beam, it is feasible to introduce appropriate phase shifts (such as +90° and −90°) into each of the two reference beams and each of the two subject beams so that there is a 180° phase shift between the two reference beams as well as between the two subject beams. Thus, all that is needed is to introduce a relative phase shift of 180° between the two reference beams and between the two subject beams.

Referring now again to FIG. 2 dotted curve 46 shows the composite amplitude of the reference beams during the second exposure, the relative phase of which has been shifted by 180° with respect to that of the beam 40. Similarly, dotted wave 47 shows the composite amplitude of the subject beams during the second exposure, the relative phase of which has been shifted 180° with respect to that of the wave 41. The intensity recorded at the recording medium 42 as a result of this phase shift is shown by the curve 48.

This 180° phase shift causes a displacement of the slow variation of intensity at the hologram, that is a displacement of the envelope of fine fringe intensity. This is clearly shown by comparison of curves 42 and 48. Accordingly, the intensity of the envelope varies like a $cos^2$ function. However, the phase of the fine fringes, that is of the individual sine waves is not changed. In view of the fact that $sin^2 A + cos^2 A = 1$, the sum of the intensities of the two envelopes is constant. Accordingly, what is recorded on the recording medium 24 is the wave 50 which has a constant fine fringe intensity. This is simply a uniform grating of fine fringes which diffracts a plane wave when the hologram is reconstructed.

What has been explained so far is what happens when a hologram is recorded in the absence of a subject. Accordingly, let us assume that a subject 51 is interposed into the path of the two subject beams, for example, between the mirror 21 and the recording medium 24. Let us further assume that the subject 51 is perturbed between the two exposures. This may mean, for example, that the subject has its physical shape distorted or that the subject is slightly moved between the two exposures. For aerodynamic work it may simply mean that the first exposure is made with the air or fluid in a quiescent state and the other exposure with the fluid in a perturbed state. Such perturbations may, for example, be caused by the passage of a bullet through the air or a rocket through air at reduced pressure.

Thus, if the subject such as 51 introduces a small differential phase shift between the two exposures, the phase of the fine fringes of the wave 48 will be shifted accordingly.

The hologram is reconstructed, for example, with a single reference beam. When the hologram is reconstructed the output wave is no longer plane but it will have a small phase wrinkle on it. The amplitude of the phase wrinkle is determined by the differential phase shift of the subject. The period of the phase wrinkle is determined by the small angle between the pair of reference beams or subject beams, that is by the space between vertical lines 43 of FIG. 2.

Thus, the reconstructed wave is a plane wave with minute phase wrinkles on it in regions corresponding to the locations where the subject introduced phase perturbations of the recording wave. This plane wave with phase wrinkles is equivalent to a true plane wave plus side order waves travelling at an angle to the true plane wave. The angle these side order wave travel relative to the true plane wave is the same as the small angle used in recording between the components of the subject and reference beams. These side order waves have an intensity dependent upon the phase perturbations introduced by the subject. In the absence of subject perturbations the side order waves are absent.

The hologram is viewed by masking off the principal reconstructions and allowing only the light from one of the side order directions to enter the viewer's eye or copy camera. This is easily accomplished by placing a lens in the reconstructed output beam from the hologram and placing an aperture stop at the focal point of the lens to stop all light except that travelling in the direction of the selected side order wave. The viewer's eye is localized just behind the aperture and views the hologram. The hologram will appear dark except where the subject has introduced phase perturbations. At these locations the brightness is proportional to the magnitude of the phase perturbation.

A mathematical analysis indicates that, for example, the subject light reflected into the first side order by the phase modulation of the grating is not in first approximation dependent on the accuracy of the phase shifter 45. Similarly, the sensitivity of the system is not dependent in the first order on having exactly equal light intensities for the two exposures.

For the discussion so far of the system of FIG. 1, it has been assumed that the small angles between the two adjacent beams and between the two reference beams are in the same plane, that is in the paper plane of FIG. 1. However, it is also feasible to arrange these angles in a vertical plane with respect to the paper plane. It is even possible to arrange these at an arbitrary angle relative to the plane of the paper subject to the following conditions. Thus, in general, it is important that the fringes of the two reference beams coincide with those of the subject beams in the plane of the recording medium 24. Accordingly, there may be a certain alignment problem. For the same reason, it will be realized that the optical elements, that is the reflectors and beam splitter, must be of a high optical quality. Furthermore, it is preferable that both the two subject beams and the two reference beams are collimated beams. However, it is feasible to utilize beams having a finite point origin. In that case the adjustment may be more difficult.

Another way of looking at the system of the present invention is to imagine that the hologram is divided into a plurality of adjacent strips. One set of these strips, say every even strip, is exposed during the first exposure while the odd strips are exposed during the second exposure. These strips correspond to the distance between two adjacent vertical lines 43 in FIG. 2. It will be realized that it would be very difficult, if not impossible, to physically expose such strips without leaving edges or unexposed portions. Therefore, in accordance with the present invention these strips are formed by the interference of light and specifically by utilizing Young's fringes.

Again the phase modulations of the regular grating may be considered a periodic phase wrinkle which causes a corresponding wrinkle in the normally plane wavefront. The periodic phase wrinkle causes light to travel at the small angle relative to the normally plane wavefront. By viewing only light travelling at one of these side orders the subject perturbations may be seen. As indicated before, this simply means that the areas corresponding to perturbation of the subject throw more light into the selected side order so that the output picture becomes brighter to indicate perturbations of the subject of less than a wavelength.

There has thus been disclosed a double-exposure holographic system which permits to visualize perturbations of a subject of much less than a wavelength. The system requires a pair of reference beams and a pair of subject beams, each pair forming a small angle. The system is not very sensitive to errors in the required phase shift of 180°. Neither is the system sensitive to variations of the light intensity between the two exposures. At least theoretically perturbations on the order of 1/100 of a wavelength can be made visible. On the other hand, the system requires elements of good optical quality and good alignment of the pair of reference beams with the pair of subject beams.

What is claimed is:

1. A double-exposure holographic interferometric system for visualizing small perturbations of a subject to be analyzed, said system comprising:
   a. a source of coherent monochromatic light;
   b. a recording medium;
   c. means for splitting the light from said source for the first exposure into a first subject beam and a first reference beam and into a second subject beam and a second reference beam and casting said beams onto said recording medium, said first and said second reference beams forming a small angle with each other at said recording medium, and said first and second subject beams forming a small angle with each other at said recording medium; and
   d. phase shifting means disposed into the path of at least one of said reference beams and one of said subject beams for the second exposure and for shifting the phase of one reference beam with respect to the other substantially by 180° and for shifting the phase of one subject beam with respect to the other substantially by 180°, whereby a subject may be interposed into the path of said subject beams and whereby perturbations of the subject will cause phase modulations of the grating recorded on said recording material.

2. A holographic system as defined in claim 1 wherein said means for splitting the light from said source includes a first beam splitter for splitting the light from said source into a first and a second beam, a second beam splitter, reflector means for recombining said first and second beams at said second beam splitter, said beam splitter and said reflector means being so disposed as to recombine said first and second beams at a slight angle with respect to each other and said second beam splitter generating said two reference beams and said two subject beams.

3. A holographic system as defined in claim 2 wherein said phase shifting means consists of a 180° phase shifter disposed into the path of one of said first and second beams and ahead of said second beam splitter.

4. The method of visualizing small perturbations of a subject to be analyzed by a double-exposed hologram consisting of a recording medium, said method comprising the steps of:
   a. generating a beam of coherent monochromatic light;
   b. splitting the monochromatic light into a first subject beam and a first reference beam and into a second subject beam and a second reference beam so that said first and second reference beams form a small angle with each other at the recording medium, and that said first and second subject beams form a small angle with each other at the recording medium;
   c. interposing a subject to be holographed into the path of said subject beams;
   d. exposing for the first time the recording medium with the two subject beams and with the two reference beams;
   e. interposing a perturbed subject into the path of the subject beams for a second exposure;
   f. shifting the phase of one of the two reference beams with respect to the other substantially by 180° and shifting the phase of one of the subject beams with respect to the other substantially by 180°; and
   g. exposing the recording medium to the two phase shifted reference beams and the two phase shifted subject beams through the perturbed subject, whereby the perturbations of the subject will cause phase modulations of the grating recorded on the recording medium.

5. The holographic method defined in claim 4 which comprises the steps of splitting the monochromatic light beam into a first and a second beam, recombining the first and second beams at a predetermined small angle to each other, splitting the recombined first and second beams each into two beams to provide the two reference beams and the two subject beams, each forming a small angle with each other, and shifting the phase of the first beam with respect to the second beam by substantially 180°.

* * * * *